United States Patent [19]
Casey et al.

[11] 3,913,684
[45] Oct. 21, 1975

[54] IMPLEMENT MOUNTING ARRANGEMENT HAVING LIFTING AND ANGLING CAPABILITY

[75] Inventors: Thomas Patrick Casey, Burlington, Iowa; Jerrold Ray Asal, Channahon; James Alan Olthoff, South Holland, both of Ill.

[73] Assignee: Caterpillar Tractor Co., Peoria, Ill.

[22] Filed: Dec. 13, 1974

[21] Appl. No.: 532,560

[52] U.S. Cl. ................ 172/804; 172/307; 172/805
[51] Int. Cl.² .......................................... E02F 3/76
[58] Field of Search ........... 172/276, 307, 484, 776, 172/800, 801, 802, 803, 804, 805, 806, 807, 172/809; 37/98, 193, 117.5

[56] References Cited
UNITED STATES PATENTS

| 2,001,803 | 5/1935 | Stephens | 172/809 |
|---|---|---|---|
| 2,404,760 | 7/1946 | Washbond | 172/801 |
| 2,565,337 | 8/1951 | Allan | 172/804 |
| 2,722,066 | 11/1955 | Wills et al. | 172/806 |
| 3,631,930 | 1/1972 | Peterson | 172/804 |
| 3,631,931 | 1/1972 | Frisbee | 172/807 |
| 3,690,386 | 9/1972 | Magee | 172/807 |
| 3,795,280 | 3/1974 | Casey | 172/804 |

Primary Examiner—Richard C. Pinkham
Assistant Examiner—R. T. Stouffer
Attorney, Agent, or Firm—Phillips, Moore, Weissenberger Lempio & Strabala

[57] ABSTRACT

The invention comprises an implement mounting arrangement having lifting and angling capability. Such an arrangement is useful, for example, for motivating a blade attached to the front of a bulldozer. The arrangement includes a support structure mountable to a tractor. Extending forwardly from the support structure are a pair of substantially horizontal frame members elevationally spaced from one another. One end of each of the members is mounted to pivot vertically from the structure. An implement, such as a bulldozer blade, generally centrally communicates in a universally pivotable manner to the other end of each of the members. An element of adjustable length, such as a hydraulic cylinder which is coplanar with one of the members and is horizontally pivotably coupled at one end thereof to said of one of said members, forms a part of the arrangement. The element is universally pivotably coupled at the other end thereof to the implement at a position thereon spaced away from the center thereof. Thus, it is possible to angle the implement by changing the horizontal angle between it and the support structure. A lifter forms yet another part of the arrangement. The lifter is of adjustable length and is vertically pivotably mounted at one end thereof to the structure at one elevation, and at the other end thereof to the implement at another elevation. Extension and contraction of the lifter serves to move the implement substantially vertically.

9 Claims, 5 Drawing Figures

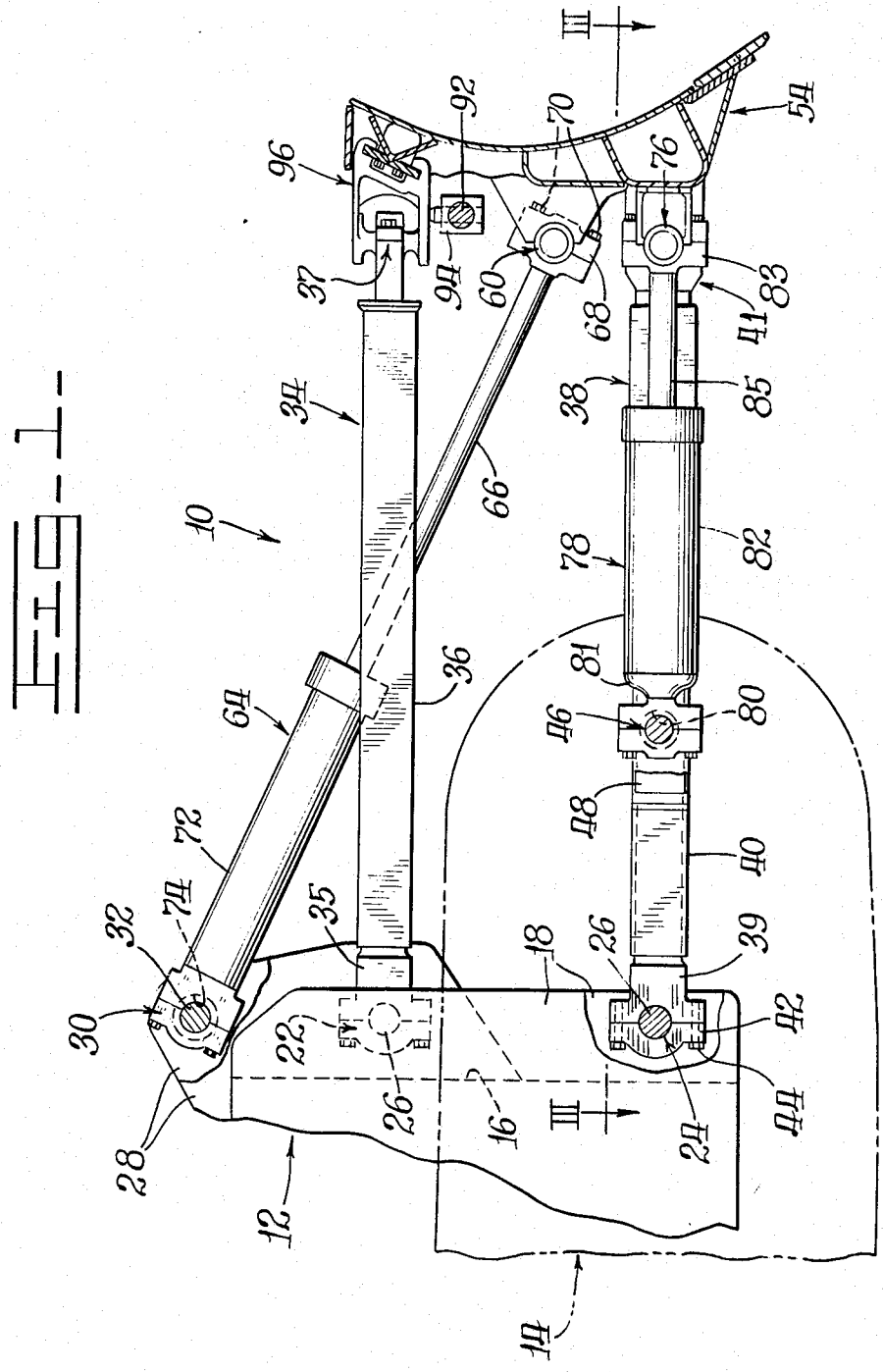

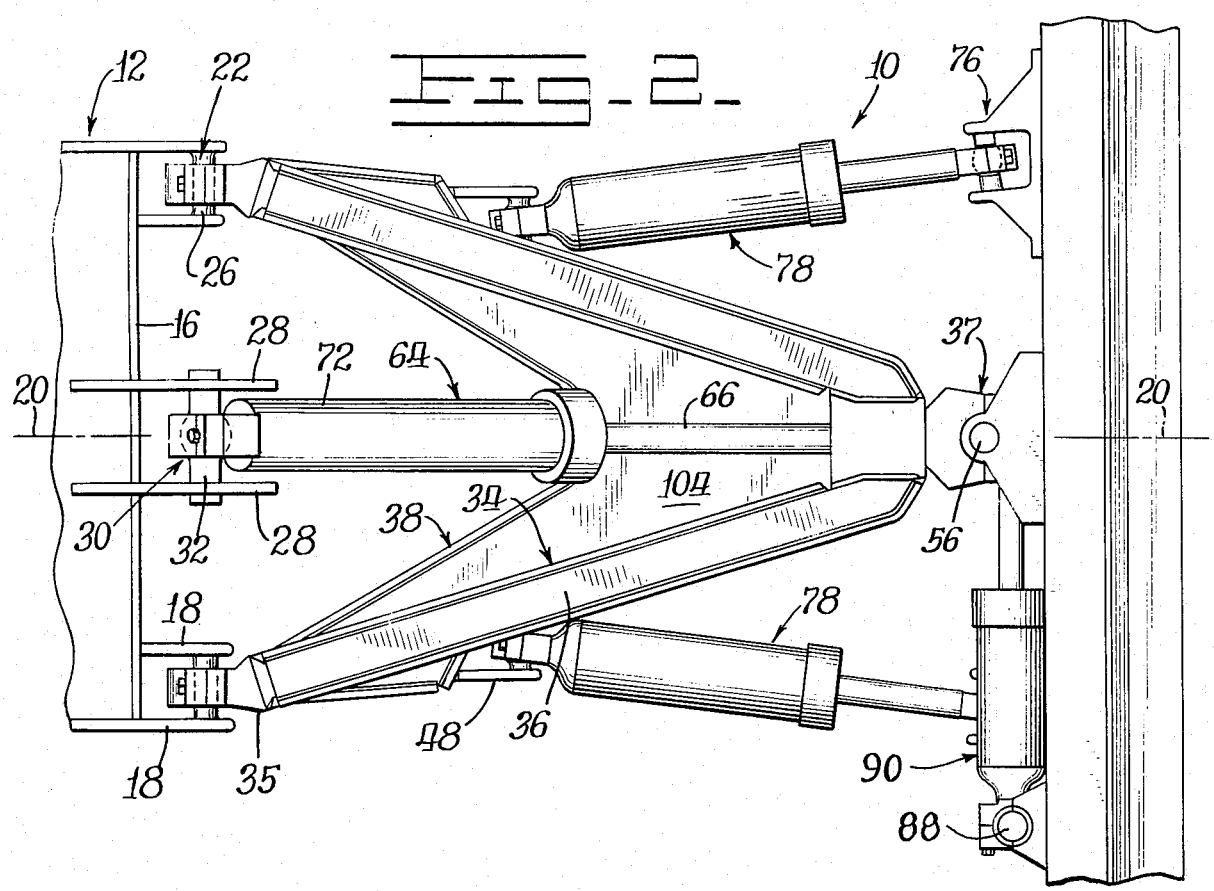
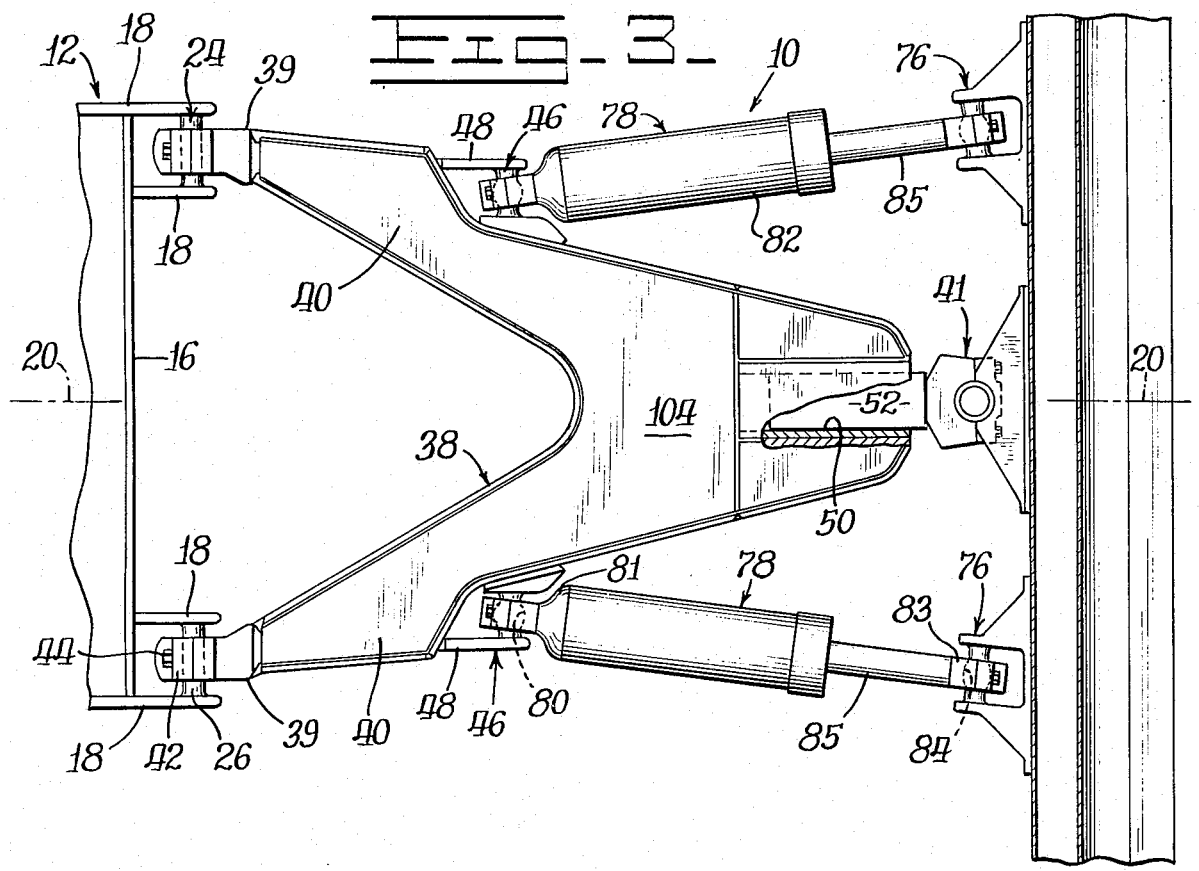

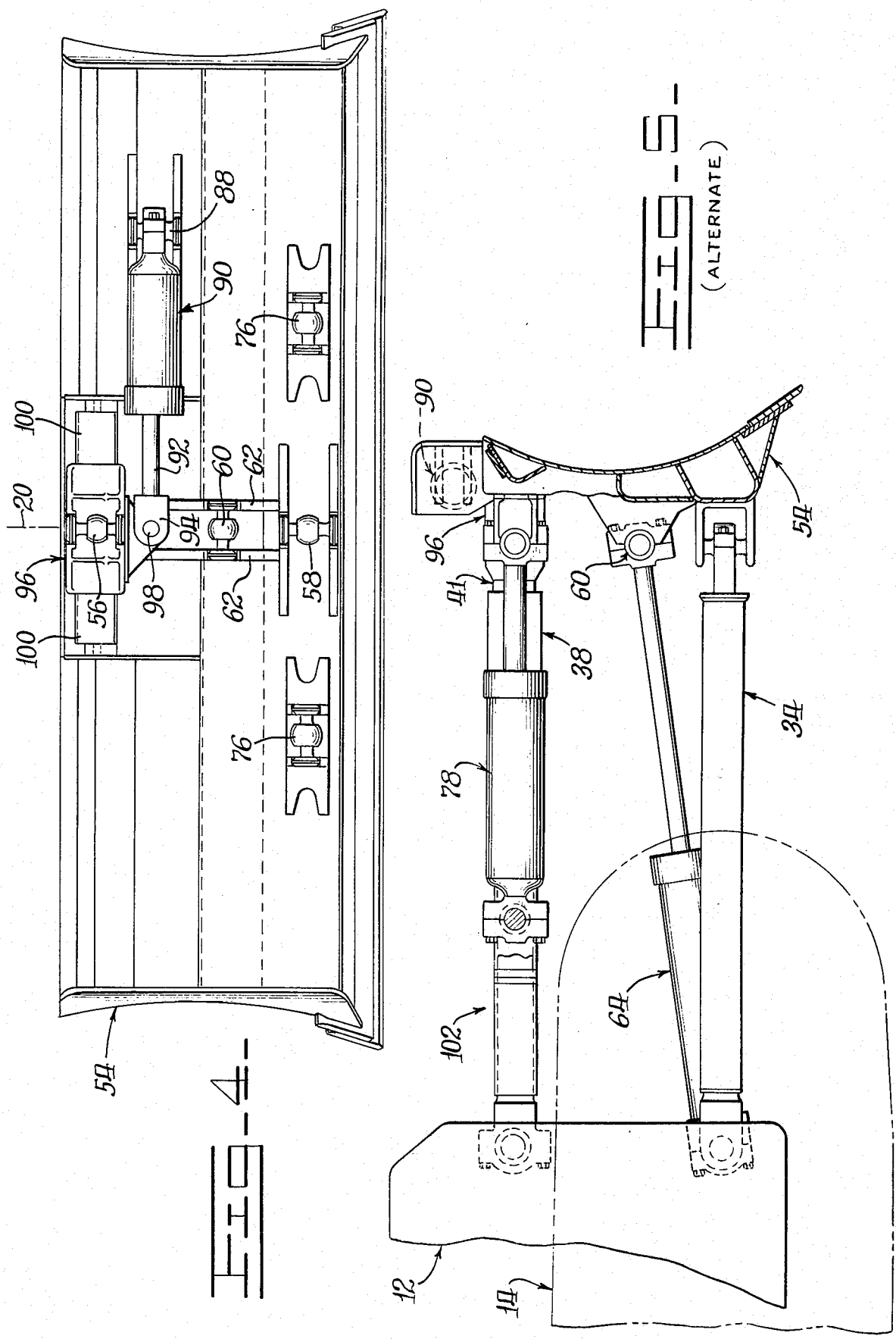

IMPLEMENT MOUNTING ARRANGEMENT HAVING LIFTING AND ANGLING CAPABILITY

BACKGROUND OF THE INVENTION

The invention is concerned with the bulldozer art and provides a novel and advantageous arrangement for lifting and angling an implement such as a bulldozer blade. In a preferred embodiment of the invention, means are also provided for tilting the implement.

PRIOR ART

A number of bulldozer blade mounting arrangements are known. Typical of prior art arrangements are those disclosed in U.S. Pat. Nos. 1,997,001; 2,766,536; 3,002,300; 3,025,620; 3,049,820; 3,234,670; 3,386,519; 3,529,678; and 3,628,612.

Bulldozer blades are usually employed to transfer large quantities of earth from one place to another. Hence, large forces acting upon the blade are transferred via the mounting arrangement to the tractor. This requires that the mounting arrangement be of extremely rugged construction and that the interconnection and interrelationship of the parts thereof be selected very carefully in order to minimize stress and wear within the arrangement.

The present invention is concerned with a mounting arrangement which is particularly effective to overcome these problems while facilitating adjustment of the blade during operation. More particularly, the present invention is concerned with a novel arrangement and interconnection of the parts of the mounting arrangement which control lifting and angling of the blade or other implements attached to the arrangement. The arrangement, the interconnection of the components, and the particular design of several of the components very effectively combine together to provide a unique and improved implement mounting arrangement.

Thus, it is an object of the present invention to provide a mounting arrangement for supporting an implement such as a bulldozer blade upon a tractor wherein stress and wear within the various components of the mounting arrangement are minimized while lifting and angling capability is fully effectively provided.

SUMMARY OF THE INVENTION

The invention comprises an implement mounting arrangement having lifting and angling capability. The arrangement includes a support structure mountable to a tractor. Also part of the arrangement are a pair of substantially horizontal frame members elevationally spaced from one another, one end of each of said members being mounted to pivot vertically from a side of said structure removed from said tractor. Another part of the arrangement is an implement generally centrally communicating in a universally pivotable manner to the other end of each of said members. Further included as part of the arrangement is an element of adjustable length generally coplanar with one of said members horizontally pivotably coupled at one end thereof to said one of said members and universally pivotably coupled at the other end thereof to said implement spaced away from the center thereof to angle said implement by changing the horizontal angle between said implement and said structure. The arrangement further includes a lifter of adjustable length vertically pivotably mounted at one end thereof to said structure at one elevation, and at the other end thereof to said implement at another elevation to move said implement substantially vertically.

BRIEF DESCRIPTION OF THE DRAWINGS

FIG. 1 is a fragmentary side view in elevation illustrating one embodiment of the present mounting arrangement and including the forward end of a tractor.

FIG. 2 is a plan view of the mounting arrangement of FIG. 1.

FIG. 3 is a horizontal sectional view of the bottom portion of the mounting arrangement of the present invention taken along the line III—III of FIG. 1.

FIG. 4 illustrates the rear side of a bulldozer blade with parts of the mounting arrangement shown attached thereto.

FIG. 5 is a fragmentary side view elevation of another embodiment of the mounting arrangement of the present invention.

DETAILED DESCRIPTION OF THE PREFERRED EMBODIMENTS

The invention will be better understood by reference to the Figures of the drawings wherein like numbers denote like parts throughout.

With reference most particularly to FIGS. 1 through 4 of the drawings, a first embodiment of the invention is illustrated comprising the mounting arrangement 10. The mounting arrangement includes a support structure 12 mounted, for example, on the frame of a track-type tractor 14. The preferred support structure illustrated includes a forwardly disposed end wall 16 with pairs of parallel plates 18 secured thereto in an upright generally longitudinally extending manner in symmetrical outward relation from a longitudinally extending central plane 20 of the tractor. The plates 18 serve to provide an upper and lower pair of transversely horizontally disposed implement mounting pivot axis 22 and 24 in the form of straight pins 26 secured to the plates. Similarly, a pair of centrally disposed parallel plates 28 are secured to the support structure in a forwardly extending manner to provide a transversely horizontally disposed lift cylinder pivot axis 30 in the form of pin and associated ball joint 32.

Secured to the upper pivot axis 22 of the support structure 12 is an upper V-shaped frame member 34 which is mounted at the ends 35 of its legs 36 to pivot vertically from said structure at said upper pivot axis by said straight pins 26. The upper V-shaped frame member has a universal socket connector 37 at the forward apex thereof. Secured to the lower pivot axis 24 of the support structure is a lower V-shaped frame member 38 pivotally mounted at the ends 39 of its legs 40 having a longitudinally reciprocal universal socket connector 41 at the forward apex thereof. The upper and lower V-shaped frame members are both mounted in forwardly extending relation from the support structure in substantially parallel horizontal relation to one another. The legs 36 and 40 of the V-shaped frames are removably secured at the ends thereof to the pins 26 by end caps 42 which are screw-threadably secured to the V-shaped frame members by retaining bolts 44. In the central portion of each leg 40 of the lower V-shaped frame is a pin-mounted ball joint 46 substantially horizontally and transversely secured between the frame and a forwardly extending ear 48. The lower V-shaped frame also has a longitudinally horizontally extending cylindrical bore 50 defined therein as illustrated in FIG. 3 in which a cylinder rod 52 can reciprocate. The rod is secured to the universal socket connector 41.

An implement 54 such as, preferably a bulldozer blade, is centrally mounted to the V-shaped frames 34 and 38 through upper and lower substantially vertically aligned universally pivotable joints, in the preferred embodiment the pin and ball joints 56 and 58 respectively, secured to the blade as shown most clearly in FIG. 4. A universally pivoting joint, in the preferred embodiment another pin and ball joint 60, is substantially transversely secured in horizontal relation between a pair of upright plates 62 attached to the blade, for connection with a lifter, in the preferred embodiment the lift cylinder 64. More particularly, the preferred lift cylinder includes an extendable rod 66 with a removable end cap 68 secured thereto by a plurality of bolts 70, so that the lift cylinder may be removably coupled to the pin and ball joint 60 for replacement thereof as necessary. The opposite or cylinder end 72 of the lift cylinder includes a vertically pivotable joint, in the preferred embodiment a spherical socket 74, disposed in grasping relation to the ball joint 32 for mounting it to the structure 12.

The bulldozer blade 54 further has secured thereto a pair of universally pivotable joints, in the preferred embodiment the pin and ball joints 76, arranged in transversely and horizontally aligned relation for operative communication with an element of adjustable length namely, in the preferred embodiment a pair of angling cylinders 78. As an alternative, only one angling cylinder 78 and one pin and ball joint 76 can be used. When this is done the bore 50 and cylinder rod 52 of the connector 41 would be rigidly interconnected. When two cylinders 78 and two pin and ball joints 76 are used more positive action and less wearing of parts results. The elements of adjustable length include a horizontally and universally pivotable socket joint 80 at the one end 81 thereof adapted to be horizontally pivotably coupled to the center of the one leg 40 of said lower V-shaped frame 38 at the ball joint 46. The socket joint 80 is formed by a cylinder portion 82 of the angling cylinders 78. At the other end 83 of the angling cylinders is a spherical socket joint 84 which, in conjunction with the pin and ball joint 76, provides for universal pivotable coupling of said angling cylinder to said blade. The spherical socket joints 84 are formed by an extendable rod portion 85 of the angling cylinders. It is, of course, understood that the cylinder and rod portions of the angling cylinders can be interchanged with one another. The angling cylinders are secured by pin and ball joints at either end thereof for universal extending movement between the ball joints 46 and 76.

The bulldozer blade also has secured thereto a substantially vertically oriented mounting pin 88 on which an extendable tilt cylinder 90 is mounted as best shown in FIG. 4. A rod end 92 of the cylinder includes a forked end 94 coupled to a slidable mechanism 96 through a pin 98. This slide mechanism is transversely glidably mounted on a guide, in the preferred embodiment the plate 100, removably secured to the blade, and supports the pin and ball joint 56 thereon.

OPERATION

In operation, the retraction and extension of lifting cylinder 64 raises the bulldozer blade 54 and lowers it through the parallelogram action achieved with the V-shaped frames 34 and 38. Angling of the blade, so as to change the angle between the blade and the support horizontally, is accomplished by extending one of the angling cylinders 78 while simultaneously retracting the other one in coordination therewith. The implement mounting arrangement 10 of the present invention has the capability of establishing the blade at a 25° angle with respect to a plane transverse to the central plane 20.

Tilting of the blade 54 is accomplished by moving the mounting pin 88 away from the central plane 20 of the tractor 14 through sliding of the plate 100 on the mechanism 96. With powered extension or retraction of the rod end 92 of the tilt cylinder 90 the blade may be tilted approximately 10° from a horizontal plane in either direction.

Since simultaneous powered angling and tilting is possible with the arrangement of the present invention, the lower V-shaped frame 38 includes the aforementioned longitudinally extendable and retractable mounting of the universal socket connector 41 which encapsulates the pin and ball joint 58 secured to the blade 54. The joint at the apex of the V-shaped frame with the angling cylinders 78 must be transversely slidable (longitudinally reciprocable) to account for the differential change in length of the linkage when it is obliquely disposed.

ALTERNATE EMBODIMENT

An alternate implement mounting arrangement 102 is illustrated in FIG. 5. The alternate arrangement includes a lift cylinder 64, a pair of angling cylinders 78, a tilt cylinder 90, and slidable mechanism 96 similar to the other preferred embodiment. However, the lift cylinder is universally pivotably mounted at its opposite ends with its attachment to the support 12 at a lower elevational level and its attachment to the blade 54 at a higher elevational level. The angling cylinders 78 are universally mounted at their ends also but in an elevationally raised position so that they are further removed from possible damage from rocks, dirt or other debris. The new placement of these cylinders also makes it desirable to relocate the longitudinally reciprocable socket connector 41 and the lower frame member 38 to the upper frame. Thus, the reciprocating joint is also further removed from possible damage during the normal operation of the blade.

To help assure good positive angling of the blade 54 the angling cylinders 78 are further separated at the ends thereof communicating with the blade 54 then at the ends thereof communicating with the legs of one of the V-shaped frames. Also, the V-shaped frames, and particularly the V-shaped frame 38 which supports the angling cylinder 78, are preferably reinforced as by partially filling in the apex end 104 of the V-shaped frame 38, as illustrated, or as by providing a cross member from one leg to another to convert the V-shaped frame into an A-shaped frame (not illustrated).

It will be noted that the lift cylinder 64 in both of the preferred embodiments of the invention is vertically pivotably mounted at one end thereof to said structure at one elevation and at the other end thereof to said implement at another elevation. Thus, when the lifter changes length there is an upward or downward movement acting upon the blade 54.

While the invention has been described in connection with specific embodiments thereof, it will be understood that it is capable of further modification, and this application is intended to cover any variations, uses or adaptations of the invention following, in general, the principles of the invention and including such departures from the present disclosures as come within known or customary practice in the art to which the invention pertains and as may be applied to the essential features hereinbefore set forth, and as fall within the scope of the invention and the limits of the appended claims.

What is claimed is:

1. An implement mounting arrangement having lifting and angling capability, comprising:

a support structure mountable to a vehicle;

a pair of substantially horizontal frame members elevationally spaced from one another, one end of each of said members being mounted to pivot vertically from a side of said structure removed from said vehicle;

an implement communicating generally in the center thereof in a universally pivotal manner to the other end of each of said members;

an element of adjustable length generally coplanar with one of said members horizontally pivotally coupled at one end thereof to said one of said members and universally pivotally coupled at the other end thereof to said implement spaced away from the center thereof to angle said implement by changing the horizontal angle between said implement and said structure; and a lifter of adjustable length vertically pivotally mounted at one end thereof to said structure at one elevation and at the other end thereof to said implement at another elevation to move said implement substantially vertically.

2. An arrangement as in claim 1, including a longitudinally slidable mechanism adjacent said implement, said mechanism carrying a universal joint thereon which communicates in said universally pivotal manner with said other of said members and said implement, the longitudinal movement of said mechanism providing horizontal movement to said universal joint, said mechanism connecting said implement and the other end of the other of said members to provide a capability for coordinated angling and tilting of said implement.

3. An arrangement as in claim 1, including a longitudinally slidable mechanism adjacent said implement, said mechanism carrying a universal joint thereon which communicates in said universally pivotal manner with said one of said members and said implement, the longitudinal movement of said mechanism providing horizontal movement to said universal joint, said mechanism connecting said implement and the other end of said one of said members to provide a capability for coordinated angling and tilting of said implement.

4. An arrangement in claim 1, further characterized in that each of said members comprises a V-shaped frame, the legs thereof comprise the one ends thereof and the apexes thereof comprise the other ends thereof, said V-shaped frames being generally parallely aligned with one another.

5. An arrangement as in claim 4, including a second element of adjustable length generally coplanar with said one of said V-shaped frames horizontally pivotably coupled at one end thereof to said one of said V-shaped frames and universally pivotally coupled at the other end thereof to said implement symmetrically to the spacing of said other end of said first element, the one end of each of said elements being horizontally pivotally coupled to the respective proximate legs of said one of said V-shaped frames, the lengths of said first and second elements being coordinatedly adjustable.

6. An arrangement as in claim 5, further characterized in that said other ends of said first and second elements are further separated from one another than are said one ends thereof.

7. An arrangement as in claim 6, wherein said first element, said second element and said lifter each comprise an extensible hydraulic cylinder.

8. An arrangement as in claim 7, including a longitudinally slidable mechanism adjacent said implement, said mechanism carrying a universal joint thereon which communicates in said universally pivotal manner with said other of said members and said implemment, the longitudinal movement of said mechanism providing horizontal movement to said universal joint, said mechanism connecting said implement and the apex of said other of said V-shaped frames of said other of said members to provide a capability for coordinated angling and tilting of said implement relative to said structure.

9. An arrangement as in claim 7, including a longitudinally slidable mechanism adjacent said implement, said mechanism carrying a universal joint thereon which communicates in said universally pivotal manner with said one of said members and said implement, the longitudinal movement of said mechanism providing horizontal movement to said universal joint, said mechanism connecting said implement and the apex of said one of said V-shaped frames of said one of said members to provide a capability for coordinated angling and tilting of said implement relative to said structure.

* * * * *